United States Patent Office 3,474,006
Patented Oct. 21, 1969

3,474,006
DETECTION OF WATER IN HALOGENATED HYDROCARBON STREAMS
Clarence I. Glassbrook, Baton Rouge, La., assignor to Ethyl Corporation, New York, N.Y., a corporation of Virginia
Filed Feb. 1, 1966, Ser. No. 524,253
Int. Cl. B01k 3/04
U.S. Cl. 204—1          3 Claims

ABSTRACT OF THE DISCLOSURE

Method and apparatus for measuring the concentration of ions from corrosion products of water in a normally anhydrous stream by passing the stream into simultaneous contact with two spaced electrodes, one electrode being centrally located in the stream and both electrodes being arranged to minimize turbulance of stream flow, and utilizing the current developed by the ions through the electrodes to actuate a measuring device, thereby indicating the concentration of the ions by the magnitude of the current.

---

This invention relates to a method for determining whether and, if desired, how much water has been admitted to a liquid halohydrocarbon stream, and an apparatus for carrying out such determination.

Water is a very undesirable inpurity in any process stream in a halohydrocarbon plant. When it is present, corrosion rates increase rapidly to high values, and it is not practical to continue operation of the plant. It is very important that the presence of water be detected a early as possible so that the plant can be shut down promptly and corrosion damage be kept as small as possible.

Because dry halogenated hydrocarbon streams containing dissolved halogen acid (e.g. HCl, HBr, etc.) are not corrosive to iron pipe while streams containing only a few hundred parts per million of water are very corrosive, many devices have been built to detect small amounts of water in streams of liquid halogenated hydrocarbons. These devices do not give satisfactory results because water is consumed by the corrosion reaction, and the amount of water left in the stream depends upon the location of the water leak, the location of the samiple point, the velocity of the halogenated hydrocarbon stream, the temperature of the stream, the amount of iron contacting the stream, and other variables.

Exemplary of the prior art devices is the apparatus of U.S. Patent 2,809,928 to Dudley et al. It will be noted that the patented device therein is a galvanic-type detector which employs an iron and a carbon electrode. This device is utilized for the direct detection of the presence of water. The construction of this device, whereby a liquid stream is injected tangentially into a larger chamber containing the moisture detecting apparatus, insures a thorough mixing of any water present with halogen acid (e.g. HCl) to furnish a true gavanic cell.

The apparatus of Dudley et al. has a major disadvantage. Galvanic-type apparatus as employed by Dudley et al. directly measures water concentration; it does not measure concentration of corrosion products. Thus, the apparatus of Dudley et al. will not disclose that water was present in the halohydrocarbon system but has been consumed in the production of corrosion products. That is if the detector of Dudley et al, is not located in the near vicinity of the leak, etc., where water is admitted to the system, the fleeting presence of water in the system will go undetected.

It is therefore a general object of this invention to overcome the above noted disadvantage of the prior art.

It is a specific object of this invention to provide a method and apparatus for determining whether and how much water has been admitted to a liquid halohydrocarbon stream.

Still a further specific object of this invention is to provide an apparatus and method for rapidly and continuously detecting whether and how much water has been admitted to a liquid halohydrocarbon stream.

Other objects and features of the present invention will appear hereinafter.

The present invention, a streaming current detector, is successful where prior art devices have failed because instead of trying to directly detect the presence of water, it measures the concentration of ions of corrosion products in the halogenated hydrocarbon stream by means of an ionic-type detector. The corrosion products consist mostly of iron halide which dissolves and ionizes in the halogenated hydrocarbon stream. It is believed that the most mobile ions are adsorbed on the wall of the pipe while the slower moving ions are carried along with the flow of the liquid. This allows segragation of the negative and positive ions in the flowing halohydrocarbon stream and facilitates ionic detection. Mobility of the ions is influenced by a number of factors including the weight of the ions and the nature of the pipe wall, i.e., the pipe may be iron, steel or other material. This theory is advanced to explain the formation of static charges in splash-filled tanks, and it is also true that an iron electrode in the center of a stream of flowing halogenated hydrocarbon collects a charge. The current which flows between the iron electrode and the iron pipe seems to be roughly proportional to the amount of iron halide ions in the stream. This is the principle upon which the present invention, a streaming current detector, operates.

In the present invention, unlike that of Dudley et al. turbulent flow is avoided. In order to employ an ionic-type detector as in the present invention, the negatively and positively charged ions must be segragated. Segregation generally occurs naturally in a flowing stream, and the present invention seeks to avoid disturbing such segregation by maintaining non-turbulent flow. Dudley et al. on the other hand, expressly desires to achieve turbulent flow which can be used to advantage with a galvanic-type detector. It is therefore evident that the present invention distinguishes over the the apparatus of Dudley et al. and other prior art galvanic-type detectors by providing apparatus of Dudley et al. and other prior art galvanic-type detector by providing apparatus which will maintain non-set turbulent flow of the halohydrocarbon stream. Methodwise, the present invention distinguishes over prior art by measuring the presence of ionized corrosion products rather than attempting to directly measure the fleeting presence of water in the liquid halohydrocarbon system.

For a fuller understanding of the nature and objects of the present invention, reference should be had to the following detailed disclosure taken in connection with the accompanying drawings wherein.

Figure 1:
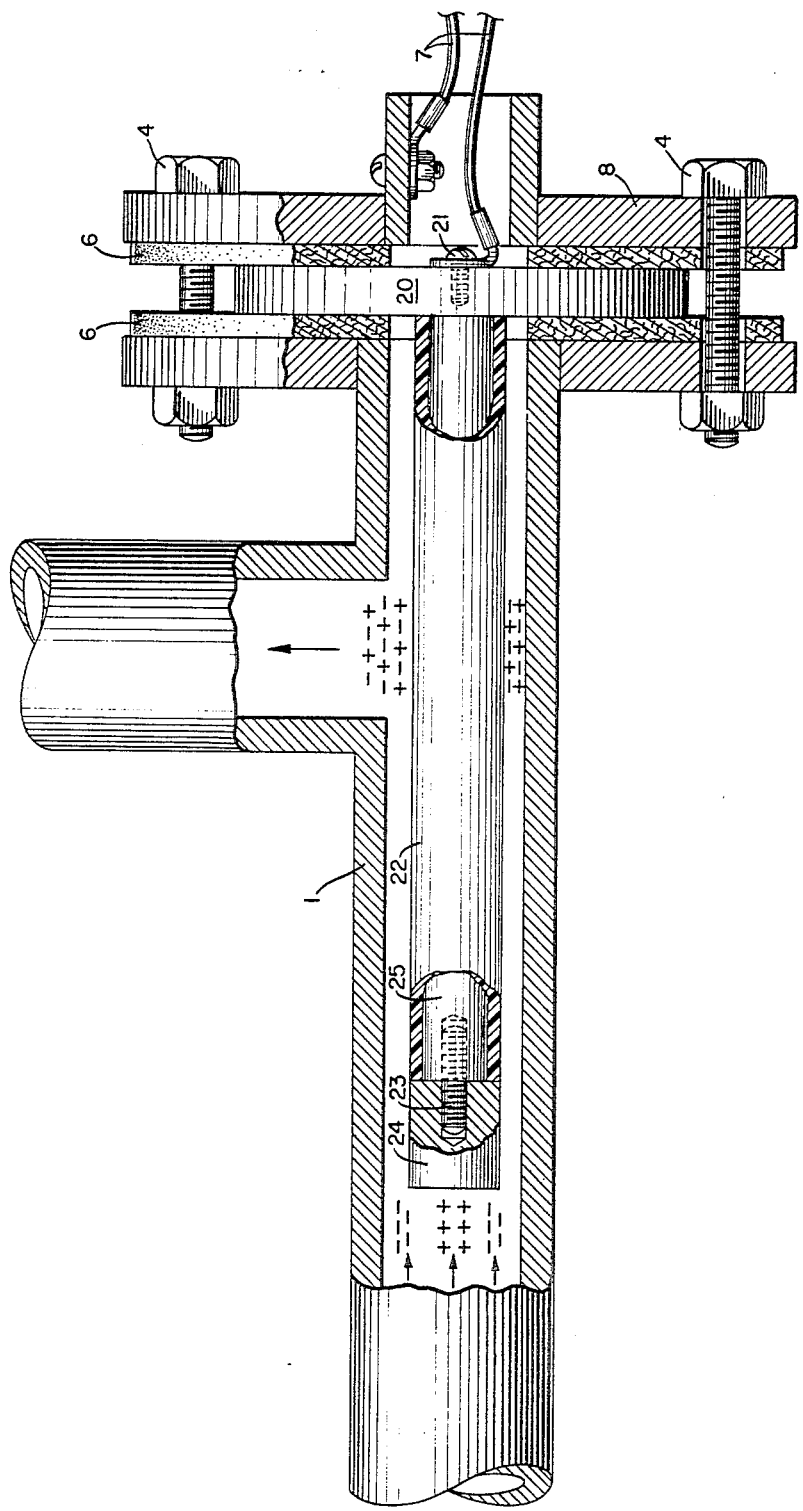
FIG. 1 shows a cutaway half section of the pipe housing with a full view of the electrode assembly having two partial cutaway sections.

Pipe housing 1 encloses the halohydrocarbon stream and the streaming current detector. The segregation of ions is shown schematically. Electrode tip 24 is well away from any turbulent area which might exist where the halohydrocarbon stream makes a turn. In the area where there is a possibility of turbulence the electrode is protected by insulation 22 (see the schematic showing of mixed positive and negative ions). This insulation extends all the way along the electrode to flange 20, which is insulated from the pipe housing by gaskets 6. Flange 20 and intermediate gaskets 6 are secured to the pipe housing by bolts 4. Wires 7 extend to a recorder which includes a voltmeter or ammeter. One wire is preferably connected to the pipe housing 1 while the other wire is connected to the electrode. Of course, the pipe housing need not be used as an electrode. It will be noted that the present apparatus is radically different from that of Dudley et al. (Patent 2,809,928 mentioned above) inasmuch as electrodes of identical material are employed, and turbulence of the flowing halohydrocarbon stream is avoided.

Figure 2:
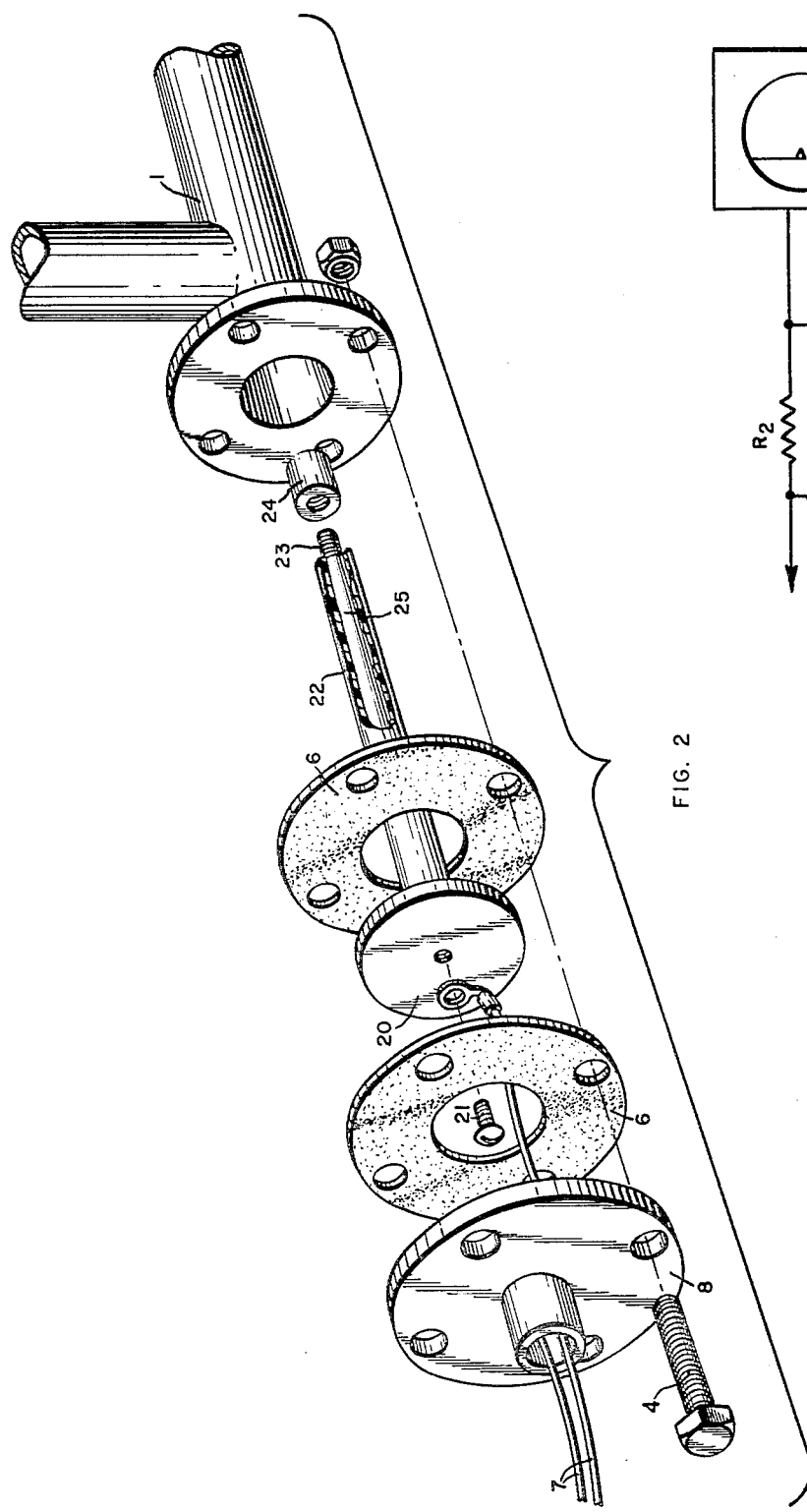
FIG. 2 shows an exploded perspective view of the pipe housing and electrode assembly with a partial cutaway view of the electrode.

FIG. 2 shows an exploded assembly of the electrode in a preferred construction. The electrode is desirably of iron or steel corresponding to the usual material for pipe. Electrode tip 24 is connected to electrode support 20, which consists of a flange and concentric perpendicularly extending axle 25, by means of stud 23. Axle 25 is surrounded by an insulating sleeve 22, e.g. Teflon. Bolt 21 is used for the purpose of making electrical connections to a recording device. The electrode of the present invention is obviously unlike the electrode of Dudley et al. which is carbon.

Figure 3:
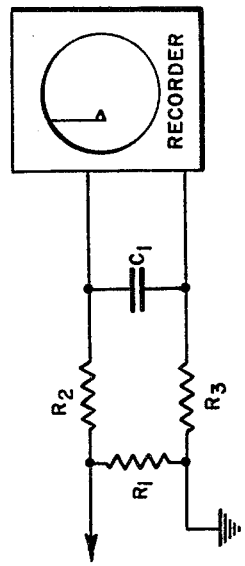
FIG. 3 shows the electrical circuit.

FIG. 3 shows the electrical circuit. $R_1$ is a load resistor while $R_2$, $R_3$ and $C_1$ form an RC filter to average out the value of the input signal from $R_1$. Exemplary apparatus would be as follows: the recorder amplifier must have a high impedance, e.g. about ½ megohm, and be ungrounded; the recorder span should be of approximately one millivolt, with the electrode tip ¾" in diameter and approximately 1" long; $R_1$ would correspondingly be 50,000 ohms, $R_2$ one million ohms, $R_3$ one million ohms and $C_1$ a 10 mfd. paper capacitor; the recorder should thus have a 0.001 volt span, upscale zero, and 500,000 ohms or more input resistance. A recorder with a center (half scale) zero is normally used for this purpose. Using the values of typical components given above, one chart division would equal $2 \times 10^{-10}$ amperes. This sensitivity is extremely high and would be used for very clean streams, the value of $R_1$ being reduced to reduce the sensitivity as required.

This instrument need not be calibrated since operating experience has shown that when a water leak develops in the unit, the streaming current makes a sudden sharp rise from its normal value and usually drives the recorder to the end of the scale. Of course, where it is desired to make a quantitative analysis, the instrument may be calibrated by recourse to simple chemical analysis of halohydrocarbon stream samples. The electrode may develop a positive or a negative voltage, depending upon the nature of the ions present and the nature of the material of the pipe and various other factors, but the apparatus will always do the same thing under the same conditions. A sudden change in streaming current means that corrosion products in the system have increased. This increase may be due to a water leak, or it may be the result of putting a pump or tower back into service after a lengthy idleness. After a plant start-up, it may take several days for the streaming current to return to normal values.

It will be understood that while there have been given herein certain specific examples of the practice of this invention, it is not intended thereby to have this invention limited to or circumscribed by the specific details of materials, portions, or conditions herein specified, in view of the fact that this invention may be modified according to individual preference or conditions without necessarily departing from the spirit of the disclosure and scope of the appended claims.

What is claimed is:

1. A method for measuring the concentration of ions from corrosion products of water in a normally anhydrous halohydrocarbon stream comprising passing the stream in a manner to minimize turbulence into simultaneous contact with two spaced electrodes, one electrode being centrally located in said stream and the other electrode being located at the periphery of the stream in the vicinity of the said one electrode, and utilizing the current developed by said ions through the electrodes to actuate a measuring device, thereby indicating the concentration of said ions by the magnitude of said current.

2. The method of claim 1 wherein said electrodes are of the same material.

3. The method of claim 2 wherein the other electrode is a pipe containing said stream.

References Cited

UNITED STATES PATENTS

| | | | |
|---|---|---|---|
| 1,807,821 | 6/1931 | Behr | 204—195 |
| 2,210,205 | 8/1940 | Elliott | 324—30 |
| 2,258,045 | 10/1941 | Christie | 324—30 |
| 2,809,928 | 10/1957 | Dudley et al. | 204—1.1 |

FOREIGN PATENTS 922,709    4/1963    Great Britain.

JOHN H. MACK, Primary Examiner

T. TUNG, Assistant Examiner

U.S. Cl. X.R.

324—29